United States Patent [19]
Brooks, Jr. et al.

[11] Patent Number: 5,717,545
[45] Date of Patent: Feb. 10, 1998

[54] SWAGING APPARTUS WITH A TUBULAR BOSS HAVING AXIALLY EXTENDING SURFACE IRREGULARITIES AND SWAGING TECHNIQUE FOR THIN ACTUATOR ARM ASSEMBLIES

[75] Inventors: William Woodrow Brooks, Jr., Rochester, Minn.; Norman Kermit Frater; Oscar Jaime Ruiz, both of San Jose, Calif.

[73] Assignee: International Business Machines Corporation, Armonk, N.Y.

[21] Appl. No.: 692,796

[22] Filed: Jul. 26, 1996

Related U.S. Application Data

[63] Continuation of Ser. No. 334,168, Nov. 3, 1994, abandoned.
[51] Int. Cl.⁶ .................... G11B 5/49; F16B 19/10
[52] U.S. Cl. .................................. 360/104; 29/523
[58] Field of Search .............................. 360/104, 105, 360/106; 29/603, 523, 237, 522.1

[56] References Cited

U.S. PATENT DOCUMENTS

| | | | |
|---|---|---|---|
| 3,567,016 | 3/1971 | Bardell | 206/65 |
| 4,481,702 | 11/1984 | Mitchell | 29/522.1 |
| 4,620,927 | 11/1986 | Casper et al. | 210/236 |
| 4,991,045 | 2/1991 | Oberg | 360/104 |
| 5,140,481 | 8/1992 | Cain et al. | 360/104 |
| 5,142,770 | 9/1992 | Cain et al. | 29/705 |
| 5,153,794 | 10/1992 | Hinlein | 360/104 |
| 5,185,683 | 2/1993 | Oberg et al. | 360/104 |
| 5,187,626 | 2/1993 | Hopkins et al. | 360/104 |
| 5,390,058 | 2/1995 | Yamaguchi | 360/104 |

FOREIGN PATENT DOCUMENTS

| | | | |
|---|---|---|---|
| 62-298012 | 12/1987 | Japan . | |
| 2294977 | 12/1990 | Japan . | |
| 03256281 | 11/1991 | Japan | 360/104 |
| 4259906 | 9/1992 | Japan . | |
| 4360081 | 12/1992 | Japan . | |
| 5120820 | 5/1993 | Japan . | |
| 2223818 | 4/1990 | United Kingdom | 29/523 |

OTHER PUBLICATIONS

IBM Tech. Disc. Bulletin — "Ball Stacking of a Transducer Assembly Mounting Block to a Positioned Arm", Hagenlocher, Jun. 1975, v18, #1, p. 226.

*Primary Examiner*—Stuart S. Levy
*Assistant Examiner*—Kevin M. Watkins
*Attorney, Agent, or Firm*—Andrew J. Dillon

[57] ABSTRACT

A low profile, miniaturized rigid disk dam storage drive includes a micro-swaged connection that mounts the transducer carrying load beams to the respective actuator arms. The micro-swage plate, that is laser welded to the load beam, includes a swage boss that does not exceed 0.3 millimeters in length. The outer periphery and the distal end surface of the tubular swage boss are tapered to counteract rotation and shearing of the boss during swaging. In applications where the smooth exterior swage boss surface does not provide sufficient torque-out capability, the periphery of the boss is formed with axially extending irregularities to enhance the torque-out capability without increasing the pull-out force that would be necessary for disassembly and rework. The preswaged boss configuration includes frusto-conical peripheral and distal end surfaces to afford a swaged configuration with a generally radial end surface and maximum swaged contact through the available length of the swage boss.

21 Claims, 7 Drawing Sheets

SWAGING APPARTUS WITH A TUBULAR BOSS HAVING AXIALLY EXTENDING SURFACE IRREGULARITIES AND SWAGING TECHNIQUE FOR THIN ACTUATOR ARM ASSEMBLIES

This is a continuation, of application Ser. No. 08/334,168, filed Nov. 3, 1994, now abandoned.

FIELD OF THE INVENTION

This invention relates to head supporting apparatus for maintaining read/write heads adjacent the surfaces of rotating disks in disk drives. More particularly, this invention relates to an improved swaging technique and apparatus for securing structures to thin support elements, such as the attachment of head/suspension assemblies to actuator arms in low profile disk drives having minimal interdisk spacings.

BACKGROUND OF THE INVENTION

Swaging the transducer head-suspension assemblies (also referred to as transducer head-gimbal assemblies) onto hard disk drive actuator arms is a preferred means of attachment because of the speed and cleanliness of the swaging process, and because of the strength of this joint and its resistance to microslip. The swaging process has been in use in rigid disk drives since the late 1960s for attaching head-suspension assemblies to actuator arms.

The design of the swage joint has been reduced in size to keep up with the miniaturization of drives. However, recent moves to disk-to-disk spacings of under two millimeters have presented a severe problem. There is not enough arm tip thickness remaining to simply miniaturize the existing design. Recently arm tips were 1.5 mm thick, and then reduced to about 1.3 mm, but presently 0.5 to 0.6 mm is as thick as can be allowed and still keep the material at the arm tip from hitting the disks during a disk drive shock event.

The reason that simple miniaturization of the swage plates is not satisfactory results from the fact that the torque-out capability that the swaged system offers drops too low to be useful. Empirical studies have shown that for relatively high yield strength aluminum arms and fully annealed stainless steel swage bosses, over 95% of the deformation of the arm is elastic, whereas over 95% of the deformation of the swage plate boss is plastic. Under these conditions, and using some simplifying assumptions, the maximum torque the swage joint can carry before slipping can be shown to be:

Max Torque=Pi×Sigma-Y×Area×OD Diameter×Coef-of-friction where:
Area=cross sectional area of a boss, considered as a toroidal thin ring. Less boss length reduces this area and thus causes lower torque-out capability. This area is approximately equal to the boss radial thickness times the engaged length.
Sigma-Y=yield strength of the boss stainless steel, usually fully annealed to minimize the maximum required swage force and to prevent microcracking during swage deformations.
OD Diameter=diameter of the outside of the boss, and is limited by packaging and mass considerations and material yield strength of the arm.
Coef-of-friction=the (static) coefficient of friction between the aluminum arm and the steel boss, and can be increased by texturing or employing non-circular shapes.

As a first order of approximation, the torque-out capability of a joint is linearly proportional to the engaged length of the swage boss, and that has dropped from something slightly less than 0.75 mm to something slightly less than 0.25 mm. Although the original 0.75 mm boss engagement length did have a slight excess of torque-out capacity, it was not enough to allow for a three fold decrease in engaged length.

The reduced boss engagement length does drastically reduce the torque-out capacity of the joint, so a number of means must be employed to regain enough of the lost capacity to again become a functional joint. One means to accomplish this is to increase the outer diameter of the boss to the largest possible value, since the torque-out capacity increases with the boss outer diameter. However, only a limited increase is possible via this method since there is a limited amount of material available in the arm tip.

Another means of increasing the torque-out capacity is to increase the coefficient of friction between the boss and the arm. One way to do this is soda blasting of the outside of the swage boss to roughen it. This process has not been introduced into production as it would involve an extra manufacturing step with a consequent part cost increase and further, this technique has been found to raise the torque-out value by only 25%.

A further means of increasing the torque-out capacity of the joint is to increase the cross sectional area of the boss. This can be accomplished by making the boss thick, that is, by a larger difference between the outside diameter and the inside diameter of the boss and by making the reduced diameter segment of the boss inner diameter as long as possible, even bringing the reduced diameter segment within the thickness of the swage plate. This increased cross section area increases the torque-out capacity, however, there are two detrimental side effects in the microswage environment. The boss length extending away from the plate is so short that when it is expanded during the swaging process, the boss tends to rotate about an imaginary point or circular axis with the result that the distal edge of the boss periphery flares out and makes line contact with the arm surface that defines the cylindrical opening. This circumferential line contact makes removal of the mount plate for rework very difficult. It also causes the distal end of the boss to rotate, making the end adjacent to the inside diameter to protrude further into the arm than the outside diameter of the boss. To prevent two mount plates from opposite sides of the arm from hitting each other, the boss lengths have to be appropriately decreased, reducing the engagement length, cross sectional area and torque.

A fairly subtle way of increasing the torque-out capacity is to make sure that all of the possible boss engaged length is actually engaged. Tolerances, boss deformation, and blend radii at the junction of the boss and swage plate surfaces can easily consume 0.1 mm of engaged length and this is a large fraction of the maximum possible engaged length of 0.25 mm.

To enhance the torque-out capability of the swage joint, one must try to not also raise the pull-out capability of the joint. During actuator rework, a head-suspension assembly is removed from the actuator usually by prying the mount plate out, so the pull-out capability should be set just high enough to resist the gram load imposed on the joint by the load beam, but not so high as to require a high, and therefore potentially damaging, pry-out force on the arm tips. The randomly oriented roughness produced by a technique such as the soda blast process would raise the pry-out force in addition to the torque-out capability and thus is not a preferred technique.

The prior art has provided a few attempts to overcome the problems associated with the attachment of head-suspension assemblies to thin arm structures. In one approach, the swage bosses inserted from opposite sides of the arm are telescoped within one another to enable a swage connection that extends the full arm thickness with respect to both bosses. This design requires multiple pans, since the bosses have different diameters and special treatment is required with respect to the arms at each end of the actuator to which only one transducer head-suspension assembly is attached. It is also usually necessary to remove both suspension assemblies attached to an arm when it is sought to rework either of such assemblies. Another approach is the use of two arm openings with the head-suspension assemblies at each side swaged into its own opening. Since the arm opening is required to be of the largest possible diameter, the cylindrical arm openings must be in tandem which results in separate parts for assemblies secured to opposite sides. This not only results in separate part designs at opposite sides of the arm, but also requires the use of larger swage plates. The increased swage plate mass adds to the actuator inertia and reduces the access time achievable for any given power input to the actuator.

SUMMARY OF THE INVENTION

The present invention enhances the torque-out capability without increasing the pry-out force when rework requires that the head-suspension assembly (or head-gimbal assembly) be separated from the arm. The swage boss design uses axially extending lobes or flutes formed in the outer peripheral surface of the boss to increase torque-out resistance without increasing the pry-out force necessary to remove the head-suspension assembly from the arm.

To assure a maximum contact area between the swage boss and the arm cylindrical opening, the boss outer peripheral surface is slightly tapered and the distal axial end surface is tapered toward the axis to provide a lesser length at the boss inner diameter. The degree of the frusto-conical configuration of both surfaces in the unswaged condition is selected to produce a substantially cylindrical boss with a substantially radial end surface following swaging. The preswaging boss configuration and the swaging parameters are utilized to achieve maximum surface engagement throughout the half length of the arm cylindrical opening without compromising or interfering with the swage joint established by an identical swage boss projecting into the arm cylindrical opening from the opposite side.

The structure of the swage plate can be created using progressive stamping techniques. Further, a single part or assembly can be used irrespective of the side of the arm to which the head-suspension assembly is attached or whether an arm has a single assembly or a pair of assemblies attached thereto. The swage connections can be separated individually such that it is never required that a good head-suspension assembly be removed because it is necessary to disassemble a failing assembly and the swage plate structure can be of minimum size and mass so as not to impair the access speed of the actuator.

DETAILED DESCRIPTION

Figures 1, 2:
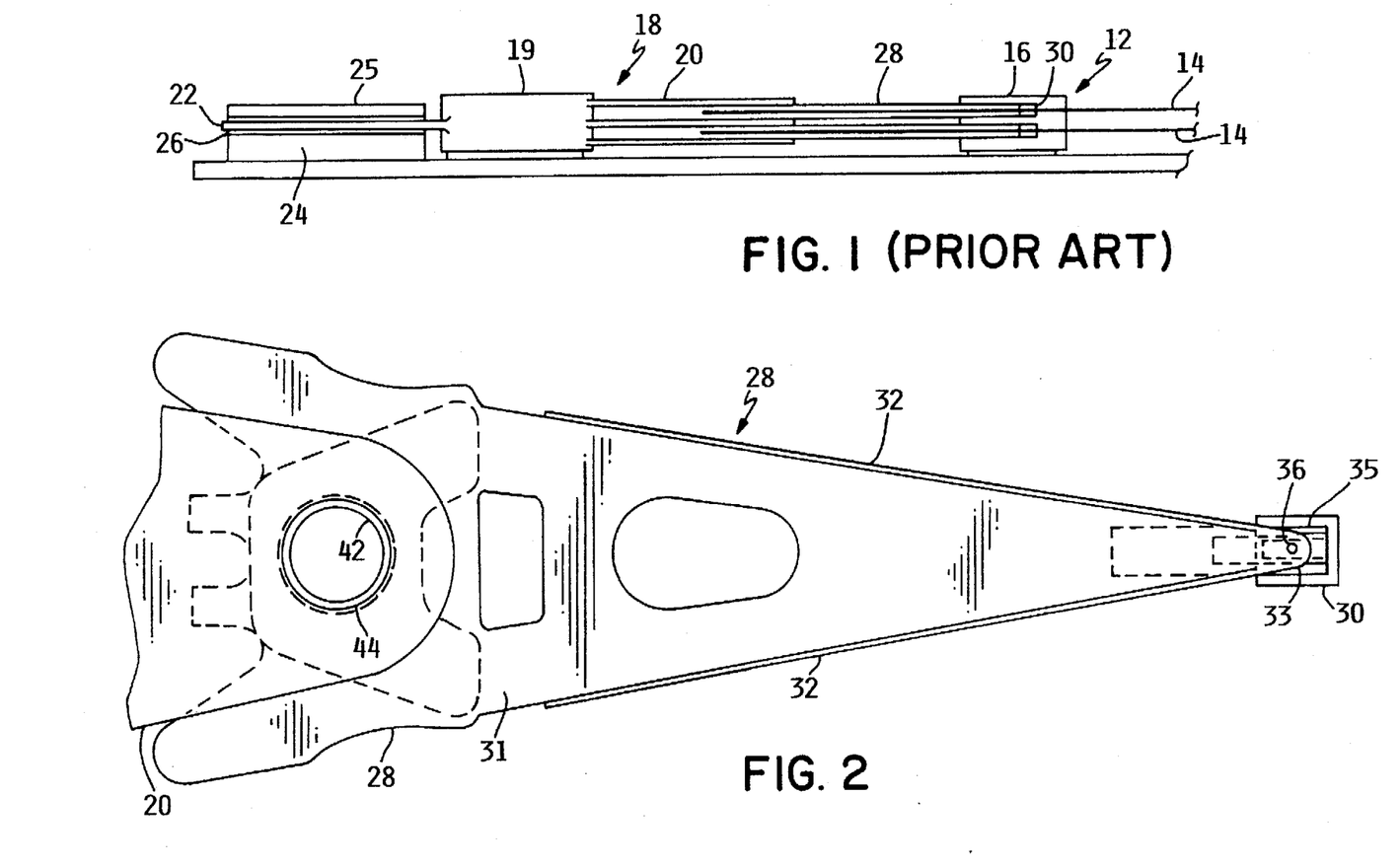
FIG. 1 is an enlarged partial elevation, partly broken away, of a typical low profile hard disk data storage device.
FIG. 2 is a plan view of a load beam-transducer assembly and part of the attached actuator arm used in the device of FIG. 1.

FIG. 1 illustrates a typical low profile data storage hard disk drive. The active mechanical assemblies are supported on a common cast metal base 10. The disk-spindle assembly 12 includes a plurality of disks 14 mounted for rotation in unison and driven by a spindle motor positioned concentrically within the hub 16. Actuator assembly 18 includes hub 19 rotatably supported on frame 10 with a series of arms 20 extending at one side and a projection 22 at the opposite side that supports a flat voice coil. Permanent magnets 24 and a magnetically permeable pole piece 25 create a flux gap 26 in which the voice coil is positioned to pivot the actuator assembly. The actuator arms 20 support load beams 28 which have transducer heads 30 secured at the distal ends that read data from the confronting disk surface and write data to the disk surface. The load beams 28 are respectively connected to the arms 20 by the swage or mounting plate of the present invention.

FIG. 2 shows the load beam 28 which carries transducer head 30 and biases the head toward the confronting disk surface. Load beam 28 is of typical design with a flexure portion 31 adjacent the connection to the arm 20, a rigidified portion with flanges 32 along the margins and a distal or terminal end portion 33. A gimbal element 35 is welded to load beam 28, bonded to the head 30 and presents a dimple 36 that is engaged by the load beam distal end 33 to afford the head two degrees of freedom (pitch and roll) with respect to the supporting load beam. Load beam 28 is secured to arm 20 by a swage or mount plate 40. Swage plate 40 is laser welded to load beam 28 to form an assembly and presents a generally cylindrical swage boss 42 that is ball swaged into a circular opening 44 adjacent the end of arm 20.

Figure 2A:
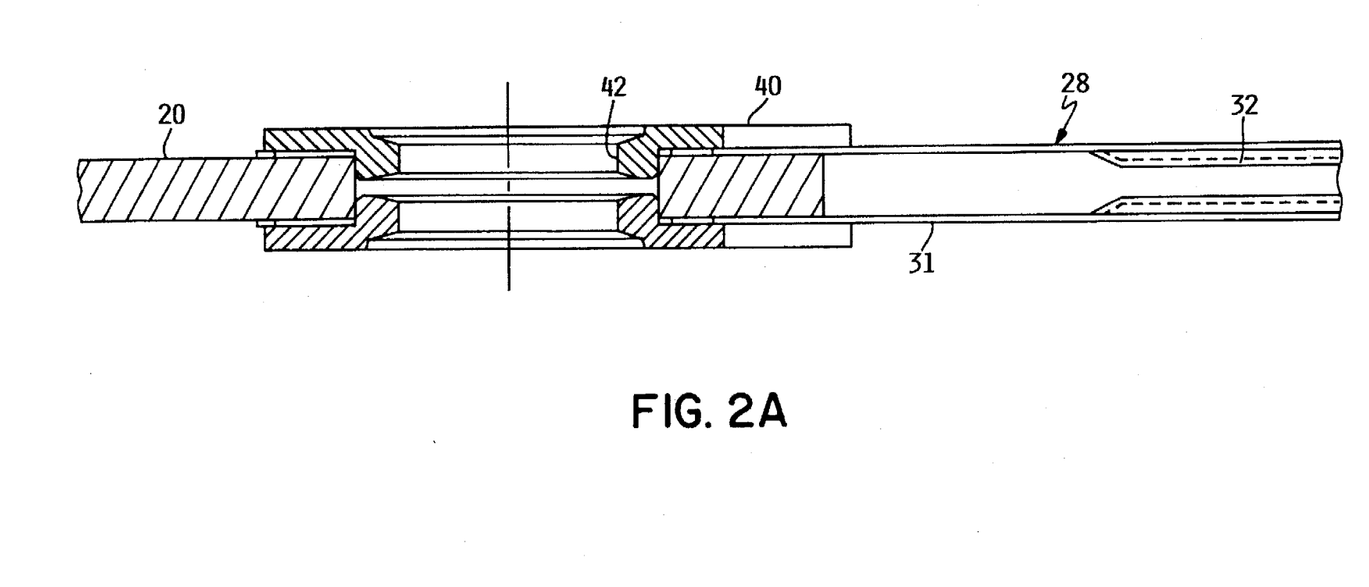
FIG. 2A is a partial sectional elevation showing an arm portion with swage plate-load beam assemblies positioned at either side prior to swaging.

In FIG. 2A, arm 20 is shown with dual load beams 28 and swage plates 40 positioned at opposite sides prior to swaging. The limitations associated with microswaged connections can be appreciated by understanding that, although the figure is enlarged for clarity, the actual dimensions are small.

The overall height of the boss is less than 0.3 millimeters and the extension into the arm cylindrical opening 44, after passing through the opening in load beam 28, is less than 0.25 millimeters.

Figures 3, 4:
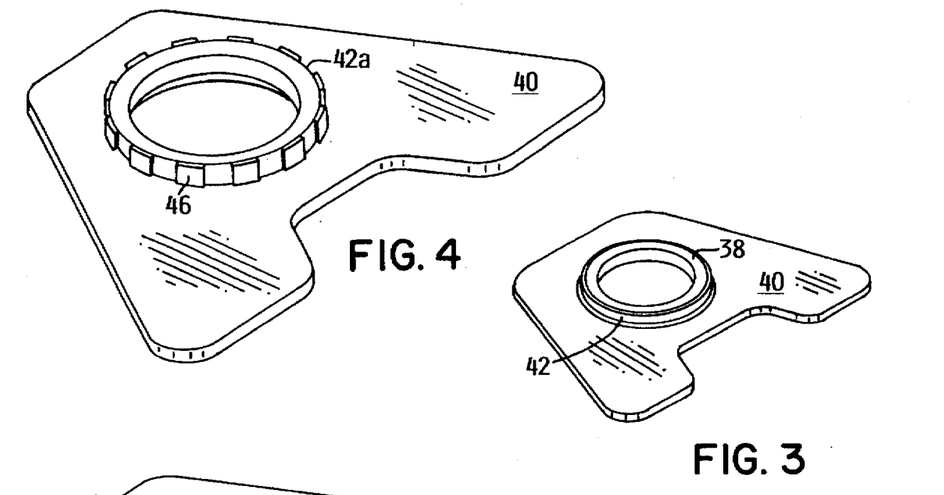
FIG. 3 is a first embodiment of the swage or mounting plate used in the device of FIG. 1.
FIG. 4 is a second embodiment of a swage or mounting plate used in the device of FIG. 1.
Figure 7:
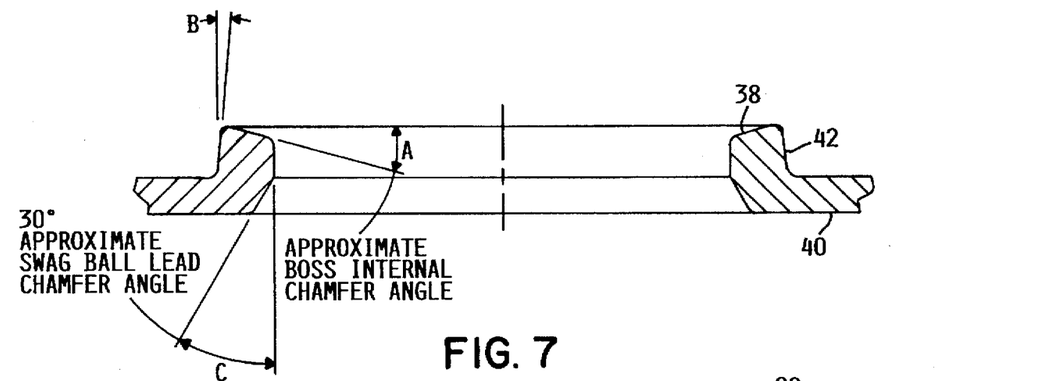
FIG. 7 is a partial section of the swage plate of FIG. 3 showing the swage boss.

FIG. 3 shows the short swage boss 42 of the present invention with frusto-conical distal end surface 38 and having a frusto-conical peripheral surface. FIG. 7 illustrates some of the structural details of the swage plate which are common to each of the embodiments of the invention, using a cross-section through swage boss.

In order to maximize the engaged length of boss 42, the end of the boss is tapered toward the axis with an angle A of about 10 degrees. Also, the swaging operation is controlled by providing a swage ball lead chamfer angle C to cause swaging to begin at the desired axial location. As the mount plate is swaged into the arm by pushing an oversized ball through the boss from the plate side and on out through the boss, the boss is slightly stretched, the boss rotates, and the internal portion of the boss is plastically sheared until the 10 degree bevel ends up being virtually parallel to the arm tip. Since two mount plates will be swaged into the same swage hole, this final geometry allows the maximum engaged length possible considering dimensional tolerances and this helps to maximize the torque-out capability.

The outer peripheral portion of the boss is tapered at an angle B of approximately 5 degrees. With this configuration, at the end of the swaging process the boss will be virtually cylindrical to give a high torque-out, and it will not expand more at the tip than a cylindrical shape so the pull-out force (required to remove a head-suspension assembly for rework) will not be excessive. This boss 'heading' or flaring effect can be quite severe if too large a ball is used or if an initially straight outer boss shape is used.

Figure 8A:
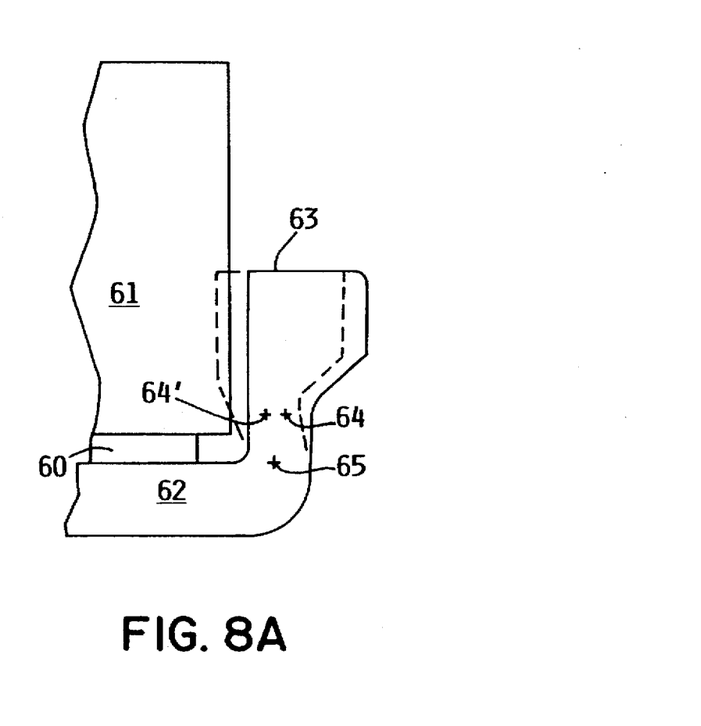
FIG. 8A is a partial section view illustrating a typical long boss cooperating with a mounting aperture and the swaged condition in phantom view.
Figure 8B:
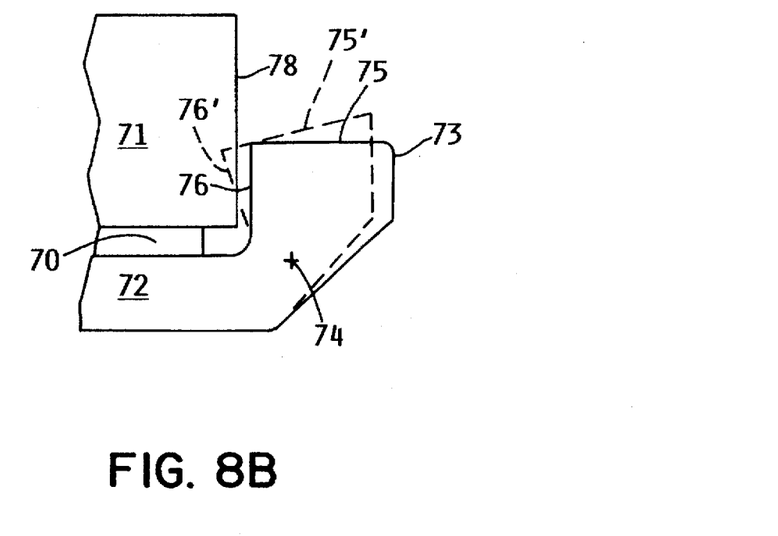
FIG. 8B is a partial section view illustrating a cylindrical short boss cooperating with a mounting aperture and the swaged condition in phantom view.

The problem solved by the boss frusto-conical surfaces can be appreciated by reference to the showings of FIGS. 8A and 8B. FIG. 8A shows a long boss design in a normal swage connector application and FIG. 8B is a short boss design which is necessary when the tubular boss is applied in a microswage application. In FIG. 8A the load beam 60 is attached to arm 61 by the swage plate 62 incorporating a long swage boss 63 of a conventional cylindrical configuration. The boss 63 is deformed during swaging from the solid line profile to the dashed line profile. During swage deformation, as a ball is driven through the boss, the boss material is upset by pivoting about a pair of circular axes 64 and 65. During swaging the axis 64 moves to the location 64'. This enables the boss to be deformed generally parallel to the cylindrical surface defining the opening through arm 61. The generally parallel translation affords an extensive contact area through the length of the boss periphery to create an effective torque-out capability without making pull-out for rework difficult. However, referring to FIG. 8B, when the conventional cylindrical configuration is used with a short boss in a microswage application, the result is markedly different. The load beam 70 is attached to the arm 71 using swage plate 72 incorporating short boss 73. During the swaging operation, the boss 73 pivots about a single circular axis of rotation 74. The upsetting of the boss material, by rotation and shearing during ball swaging, displaces the boss distal end surface 75 to the dash line position 75' and the peripheral surface 76 to the dash line position 76'. As shown, the short boss, during the progress of the swaging operation, makes initial line contact and the resulting interference varies along the length of the boss. Further, the swaged engagement of the boss 73 with the opening surface 78 occurs over only about 50% of the available confronting surface. The result is that the torque-out capability is limited by the failure to swage the full length of the boss into contact with the opening surface 78 while the enhanced pull-out force capability makes removal of the swage plate-load beam assembly from the arm for rework significantly more difficult.

The problem associated with the conventional cylindrical short boss when implementing a microswaged connection is overcome by the microswage boss design of the present invention. The angle B of the boss peripheral surface 42 may be varied between 2 and 8 degrees to adapt to the specific boss configuration and component materials. The angle A of the frusto-conical distal end surface may be varied between 5 and 15 degrees to accommodate boss material and configuration parameters.

Figure 5:
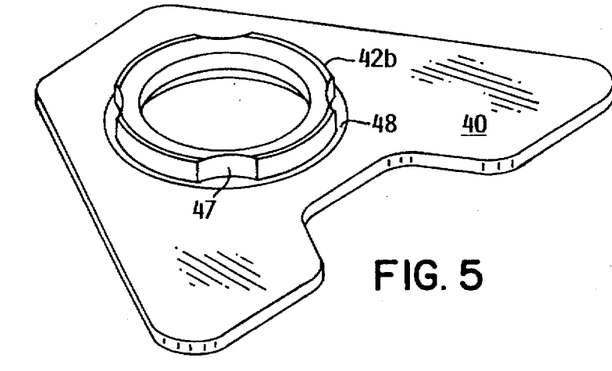
FIG. 5 is a third embodiment of a swage plate used in the device of FIG. 1.
Figure 6:
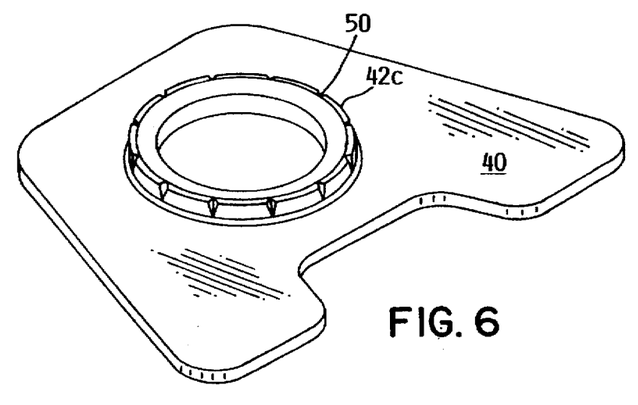
FIG. 6 is a fourth embodiment of a swage plate used in the device of FIG. 1.

FIGS. 4, 5 and 6 are isometric views of three alternate versions of the swage mounting devices of the present invention. The plate portion of the swage or mounting plate is shown throughout the description of the invention in a specific configuration, but the shape selected for this structural portion can be tailored to fit the requirements of the load beam to which it is attached. FIG. 4 shows a convex lobe design, FIG. 5 a concave lobe design and FIG. 6 a serrated periphery design.

The outer peripheral surface of boss 42a has axially extending irregularities such as the convex flutes of FIG. 4, the concave flutes of FIG. 5 or the serrated periphery of FIG. 6 to enhance torque-out while not raising the pull-out force. The choice of which style of flutes or axial irregularities to use depends primarily on the relative yield strengths of the mount plate and arm materials. By forcing as much material as possible to become plastic before the boss turns will maximize the torque-out capability. The choice also depends on the capability of the progressive stamping process to impress the desired features on the outer periphery of the preswaged boss.

FIG. 4 illustrates a swage plate 40 with a boss 42a that presents a series of convex lobes 46 about the periphery which establishes torque-out resistance without any significant alteration of the pull-out force required to separate the swage plate from the arm. The section view of FIG. 7 is illustrative of the structure of the boss 42a.

Figure 5A:
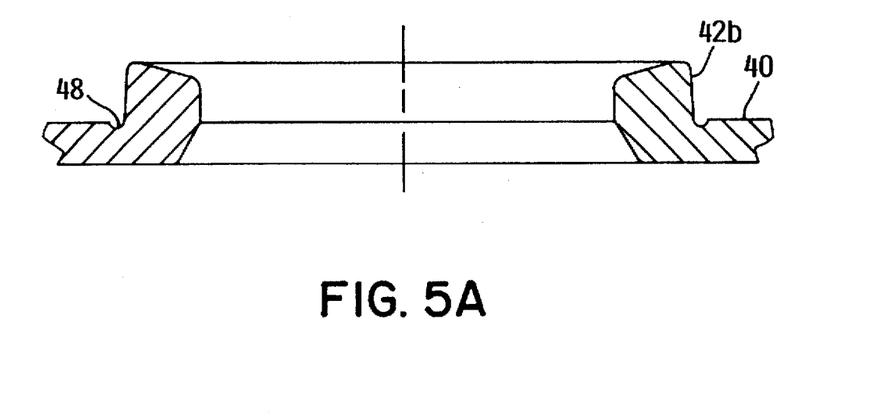
FIG. 5A is a partial section of the swage plate of FIG. 5 showing the swage boss.

The swage or mounting plate of FIG. 5 is similar to that of FIG. 4, except that the boss 42b has the frusto-conical outer periphery periodically interrupted by a plurality of axially extending scoops, flats or depressions 47 that provide axially extending irregularities which impart torque-out capability without measurably increasing the pull-out force to effect separation of the swaged connection. The section view of FIG. 5A shows a configuration similar to that of FIG. 7 and further includes a relief groove 48 to further assure intimate swaged contact of the boss 42b periphery with the surface defining the opening through the cooperating actuator arm. Relief groove 48 also helps define the effective center of the rotation axis 74 (shown in FIG. 8B). The intersection of the lead chamfer angle C and the reduced diameter portion of the boss inside diameter in FIG. 5A occurs at approximately the same axial distance as the top of the swage plate. This confines the radial plastic deformations, during the swaging, to begin in the portion of the boss extending from the swage plate.

Figure 6A:
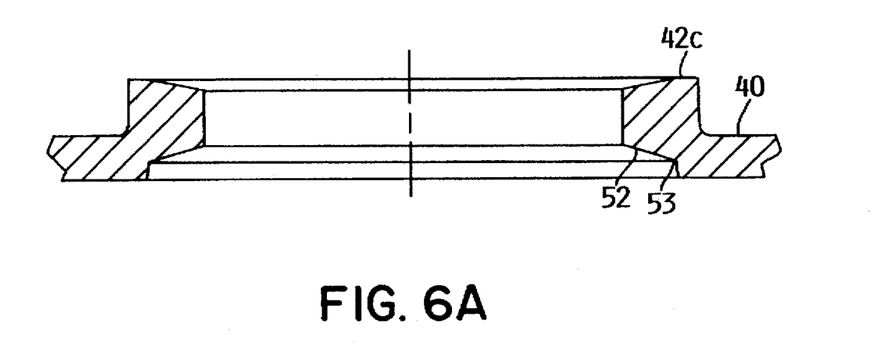
FIG. 6A is a partial section of the swage plate of FIG. 6 showing the swage boss.

The embodiment of FIG. 6, with the boss 42c shown in the section view of FIG. 6A, utilizes serrations 50 formed by inclined surfaces having an intersection line disposed at a 70 degree angle to the surface of swage plate 40. The opening through boss 42c is initially substantially cylindrical with a frusto-conical surface 52 that affords the swage ball lead chamfer angle. The intersection of the lead chamfer angle C and the reduced diameter portion of the boss inside diameter in FIG. 6A occurs within the thickness of the swage plate. This configuration causes the radial plastic deformations during the swaging to begin within the thickness of the swage plate. For very short boss lengths this configuration achieves the highest possible cross sectional area. The shoulder 53 formed between the lead chamfer angle C and the counterbore shown in FIG. 6A helps to define the center of rotation 74 shown in FIG. 8B and reduce resulting deformations of the swage plate.

Figure 9A:
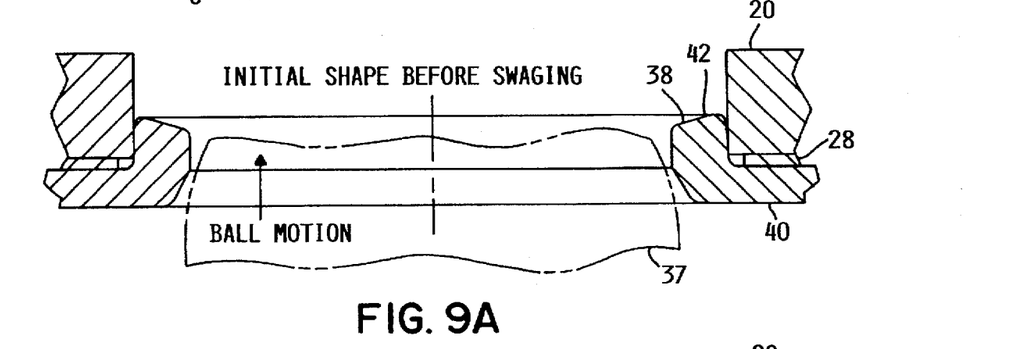
FIGS. 9A, 9B and 9C are partial section views that illustrate the stages of the swaging operation with FIG. 9A being prior to swaging, FIG. 9B showing the partially deformed shape during swaging and 9C showing the deformed shape after swaging.
Figure 9B:
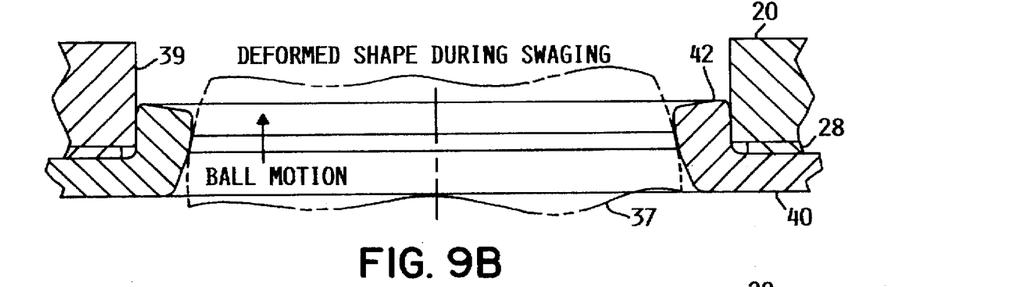
Figure 9C:
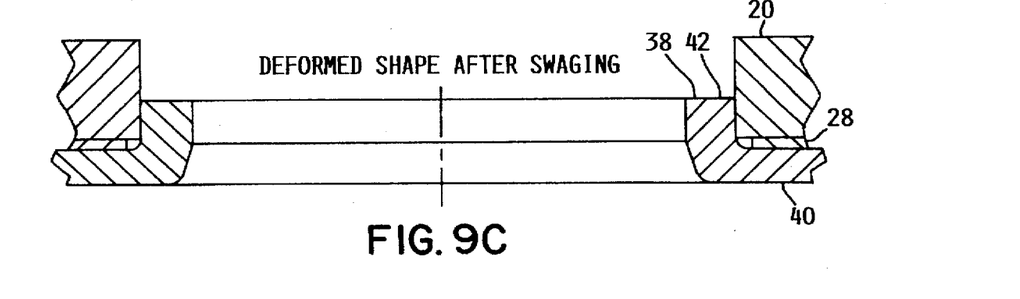

FIGS. 9A, 9B and 9C are a progressive showing of the swaging of the swage boss of the present invention to secure the load beam (welded to swage plate 40) to arm 20. In FIG. 9A the unswaged boss presents the frusto-conical surfaces at the periphery (angle B, FIG. 7) and the distal end (angle A, FIG. 7). FIG. 9B is the intermediate stage wherein the boss is partially upset and is being plastically deformed into contact with the surface of the arm opening. In FIG. 9C, boss 42 is completely swaged into an interfering contact with the arm surface 39 to establish contact throughout the confronting surfaces between boss periphery and the surface forming the arm opening. The boss end surface 38 has now been plastically deformed from the original frusto-conical configuration to a substantially radial surface orientation.

Figure 10:
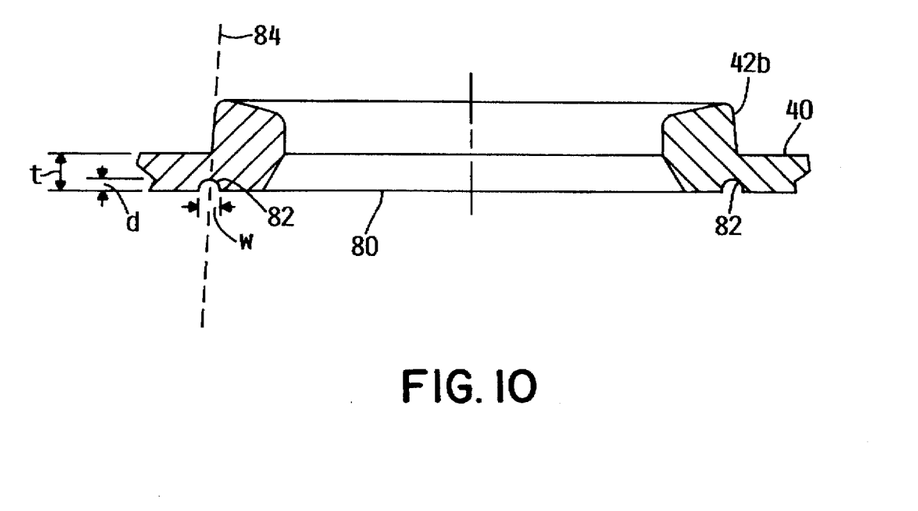
FIG. 10 is a partial section of a fifth embodiment of the swage plate.

FIG. 10 shows a partial section of a swage plate 80. Swage plate 80 is similar to the swage plate shown in FIG. 5A with the exception that the relief groove 48 located on the top surface has been eliminated and a stress relief groove 82 has been added to the bottom surface on the opposite side of the boss 42B. Groove 82 is substantially semicircular in cross section and extends in a substantially circular pattern around the internal aperture of the swage plate 80. The groove 82 is preferably continuous, although an interrupted circular pattern comprised of a plurality of depressions is also possible. The groove 82 is located such that some portion of the groove 82 intersects a plane 84 which extends from the outer surface of the boss 42B. The depth d of the groove 82 is preferably in the range of 5–50% (typically approximately 40%) of the thickness t of the plate portion of the swage plate 40. The width w of the groove 82 is preferably in the range of 10–100% (typically 60%) of the thickness t.

The advantage of the groove 82 is that it reduces distortion and increases the holding torque of the swage plate. The groove 82 acts to localize the distortion where the bending takes place during the swage process. This distortion is preferably located on the bottom surface and away from the top surface which interfaces with the arm.

Although several embodiments of the present invention have been shown and described, it will be understood that various modifications may be made without departing from the spirit and scope of the invention. Accordingly, it is to be understood that the invention is not to be limited by the specific illustrated embodiments, but only by the scope of the appended claims.

We claim:

1. A transducer head-gimbal assembly for use in a rigid disk data storage device comprising:

an actuator arm having a generally circular opening extending therethrough;

a swage plate with a tubular boss received in said generally circular opening; and a transducer supporting load beam secured to said actuator arm by said swage plate, said tubular boss having an axisymmetric outside diameter surface adjoining a bottom surface of said swage plate, an axisymmetric inside diameter surface defining a bore hole through said swage plate, and an axisymmetric distal end surface adjoining said outside diameter surface and said inside diameter surface, wherein some portion of said inside diameter surface lies within said bore hole between a plane defined by a top surface of said swage plate and a plane defined by said bottom surface of said swage plate, wherein said outside diameter surface is a single frusto conical surface having a largest diameter end adjoining said bottom surface of said swage plate, and wherein an upsetting of the material of said tubular boss by an expansion tool changes said outside diameter surface of said tubular boss to become substantially parallel to the axial direction of said tubular boss to produce an interference fit with the adjacent actuator arm wall surface that forms said generally circular opening such that said upsetting also changes said distal end surface of said tubular boss to become substantially perpendicular to the axial direction.

2. The transducer head-gimbal assembly of claim 1 wherein said frusto conical surface forms an angle of 2 to 8 degrees with respect to the axis of said tubular boss.

3. The transducer head-gimbal assembly of claim 1 wherein said distal end surface is a single frusto conical surface whose largest diameter end adjoins said outside diameter surface of said swage plate.

4. The transducer head-gimbal assembly of claim 3 wherein said frusto conical surface forms an angle of 5 to 10 degrees with respect to a plane parallel with the bottom surface of said swage plate.

5. The transducer head-gimbal assembly of claim 1 wherein the maximum extent of said distal end surface away from said bottom surface of said swage plate does not exceed 0.3 millimeters.

6. The transducer head-gimbal assembly of claim 1 wherein said outside diameter surface of said tubular boss is augmented or diminished by one or more linear surface irregularities, each of said surface irregularities comprises a linear extension of a simple geometric outline along an axis substantially parallel with said axis of said tubular boss.

7. The transducer head-gimbal assembly of claim 6 wherein said outside diameter surface of said tubular boss is augmented or diminished by one or more linear surface irregularities, each of said surface irregularities comprises a linear extension of a simple geometric outline along a second axis inclined to said axis of said tubular boss in which said second axis lies on a frusto conical surface whose axis substantially coincides with said axis of said tubular boss.

8. The assembly of claim 1 further comprising at least one depression located in the surface of the swage plate opposite the tubular boss and substantially surrounding the circular opening in the swage plate which is the inner diameter of the tubular boss.

9. The assembly of claim 8, wherein the depression is a continuous groove having a depth in the range of 5–50% of the swage plate thickness and having a width in the range of 10–100% of the swage plate thickness.

10. A rigid disk data storage transducer head-gimbal assembly comprising an actuator arm with a generally circular opening extending therethrough;

a swage plate with a tubular boss portion which extends into said actuator arm generally circular opening; and a transducer supporting load beam secured to said arm by said swage plate, said swage plate tubular boss portion having an axisymmetric outside diameter surface adjoining a bottom surface of said swage plate, an axisymmetric inside diameter surface defining a bore hole through said swage plate, and an axisymmetric distal end surface adjoining said outside diameter surface and said inside diameter surface, wherein some portion of said inside diameter surface lies within said bore hole between a plane defined by a top surface of said swage plate and a plane defined by said bottom surface of said swage plate, wherein said outside diameter surface is a single frusto conical surface having a largest diameter end adjoining said bottom surface of said swage plate, and wherein an upsetting of the material of said tubular boss by an expansion tool changes said outside diameter surface of said tubular boss to become substantially parallel to the axial direction of said tubular boss to produce an interference fit with the adjacent actuator arm wall surface that forms said generally circular opening such that said upsetting also changes said distal end surface of said tubular boss to become substantially perpendicular to the axial direction.

11. The rigid disk data storage device head-gimbal assembly of claim 10 wherein said axially extending irregularities are concave irregularities.

12. The rigid disk data storage device head-gimbal assembly of claim 10 wherein said axially extending irregularities are convex irregularities.

13. The rigid disk data storage device head-gimbal assembly of claim 10 wherein said load beam is welded to said swage plate.

14. The rigid disk data storage device head-gimbal assembly of claim 13 wherein the boss inner generally cylindrical surface has a diameter which is reduced within the portion extending from the swage plate and said swage plate boss is ball swaged into engagement with the surface forming said generally cylindrical opening in said actuator arm whereby the boss axial end surface is upset to lie in a plane substantially perpendicular to the axial direction of the tubular boss.

15. The rigid disk data storage device head-gimbal assembly of claim 10 wherein said swage plate tubular boss portion extending from said swage plate does not exceed a length of 0.3 millimeters.

16. The assembly of claim 10 further comprising at least one depression located in the surface of the swage plate opposite the tubular boss and substantially surrounding the circular opening in the swage plate which is the inner diameter of the tubular boss.

17. The assembly of claim 16, wherein the depression is a continuous groove having a depth in the range of 5–50% of the swage plate thickness and having a width in the range of 10–100% of the swage plate thickness.

18. A rigid disk data storage device comprising a base member;

a disk assembly including a plurality of disks mounted for rotation in unison and mounted on said base member;

an actuator mounted on said base member including a plurality of arms with mounting holes adjacent the distal ends and driven by a voice coil motor;

a plurality of load beam-transducer assemblies; and a micro-swage connector carried by each of said load beam-transducer assemblies and received in respective actuator arm mounting holes, each said micro-swage connector including a tubular boss, wherein said tubular boss having an axisymmetric outside diameter surface adjoining a bottom surface of a swage plate;

an axisymmetric inside diameter surface defining a bore hole through said swage plate;

an axisymmetric distal end surface adjoining said outside diameter surface and said inside diameter surface, wherein some portion of said inside diameter surface lies within said bore hole between a plane defined by a top surface of said swage plate and a plane defined by said bottom surface of said swage plate, wherein said outside diameter surface is a single frusto conical surface having a largest diameter end adjoining said bottom surface of said swage plate, and wherein an upsetting of the material of said tubular boss by an expansion tool changes said outside diameter surface of said tubular boss to become substantially parallel to the axial direction of said tubular boss to produce an interference fit with the adjacent actuator arm wall surface that forms said generally circular opening such that said upsetting also changes said distal end surface of said tubular boss to become substantially perpendicular to the axial direction.

19. The rigid disk data storage device of claim 18 wherein said micro-swage connector swage boss does not exceed a height of 0.3 millimeters.

20. The assembly of claim 18 further comprising at least one depression located in the surface of the swage plate opposite the tubular boss and substantially surrounding the circular opening in the swage plate which is the inner diameter of the tubular boss.

21. The assembly of claim 20, wherein the depression is a continuous groove having a depth in the range of 5–50% of the swage plate thickness and having a width in the range of 10–100% of the swage plate thickness.

* * * * *

UNITED STATES PATENT AND TRADEMARK OFFICE
CERTIFICATE OF CORRECTION

PATENT NO. : 5,717,545
DATED : February 10, 1998
INVENTOR(S) : Brooks, Jr. et al.

It is certified that error appears in the above-identified patent and that said Letters Patent are hereby corrected as shown below:

In the Title:

Change "APPARTUS" to --APPARATUS--.

In the Abstract:

Line 1, change "dam" to --data--.

Column 1, line 1 change "APPARTUS" to --APPARATUS--.

Signed and Sealed this

Tenth Day of April, 2001

*Attest:*

NICHOLAS P. GODICI

*Attesting Officer*     *Acting Director of the United States Patent and Trademark Office*